United States Patent [19]
Sparks

[11] 3,902,809
[45] Sept. 2, 1975

[54] APPARATUS WITH MULTIPURPOSE SAMPLE CAVITY FOR EMISSIVITY AND ABSORPTIVITY MEASUREMENTS

[75] Inventor: Marshall S. Sparks, Malibu, Calif.
[73] Assignee: Xonics, Inc., Van Nuys, Calif.
[22] Filed: Nov. 30, 1973
[21] Appl. No.: 420,670

[52] U.S. Cl. .................. 356/85; 356/201; 356/256
[51] Int. Cl. ......................... G01n 21/22; G01j 3/02
[58] Field of Search ......... 356/51, 85, 96, 201, 236, 356/256, 43; 350/266; 250/228

[56] References Cited
UNITED STATES PATENTS
2,792,484  5/1957  Gurewitsch et al. ................... 356/43
3,749,495  7/1973  Wilkins et al. ......................... 356/51

Primary Examiner—Ronald J. Stern
Assistant Examiner—F. L. Evans
Attorney, Agent, or Firm—Harris, Kern, Wallen & Tinsley

[57] ABSTRACT

An apparatus for measuring emissivity and/or absorptivity of a sample in a highly reflective, spherical sample cavity in a sample chamber or holder. The sample chamber is provided therein with a modulation hole exposed to constant external temperature, the apparatus including modulating means for periodically opening and closing the modulation hole, thereby periodically spoiling the quality factor Q of the cavity. For emissivity measurements, a signal, modulated by the modulating means, emanates from the cavity through a small signal hole for detection by an external detection means, a large portion of the energy exiting through the signal hole. The sample chamber is split into two parts which are separable to open the sample cavity for insertion of a heated sample from an external heating means, the sample chamber normally being isolated from the heating means by a movable shielding means. For absorptivity measurements, or for heating the sample, radiant energy is directed into the cavity through an input hole spaced from the modulation and signal holes, an external detecting means, such as a spectroscopic detecting means, measuring the sample temperature through the signal hole. For either the emissivity or the absorptivity mode, the apparatus is enclosed in an evacuated housing having air lock means through which the sample may be inserted and removed. The sample chamber may be maintained at a desired low temperature by thermally connecting the two halves thereof to a container of liquid nitrogen.

With the foregoing construction, the apparatus of the invention provides a high signal-to-noise ratio and thermal problems are solved by setting the temperature of the sample externally of the cavity. The device measures smaller values of emissivity and absorptivity (which are not independent) than previously possible, and makes these measurements over a large range of wavelength and temperature. A method of measuring absorption coefficients $\beta < 10^{-4} cm^{-1}$ is provided. Such low values cannot be measured in conventional transmission spectrometers, and are difficult in conventional laser calorimeters.

14 Claims, 1 Drawing Figure

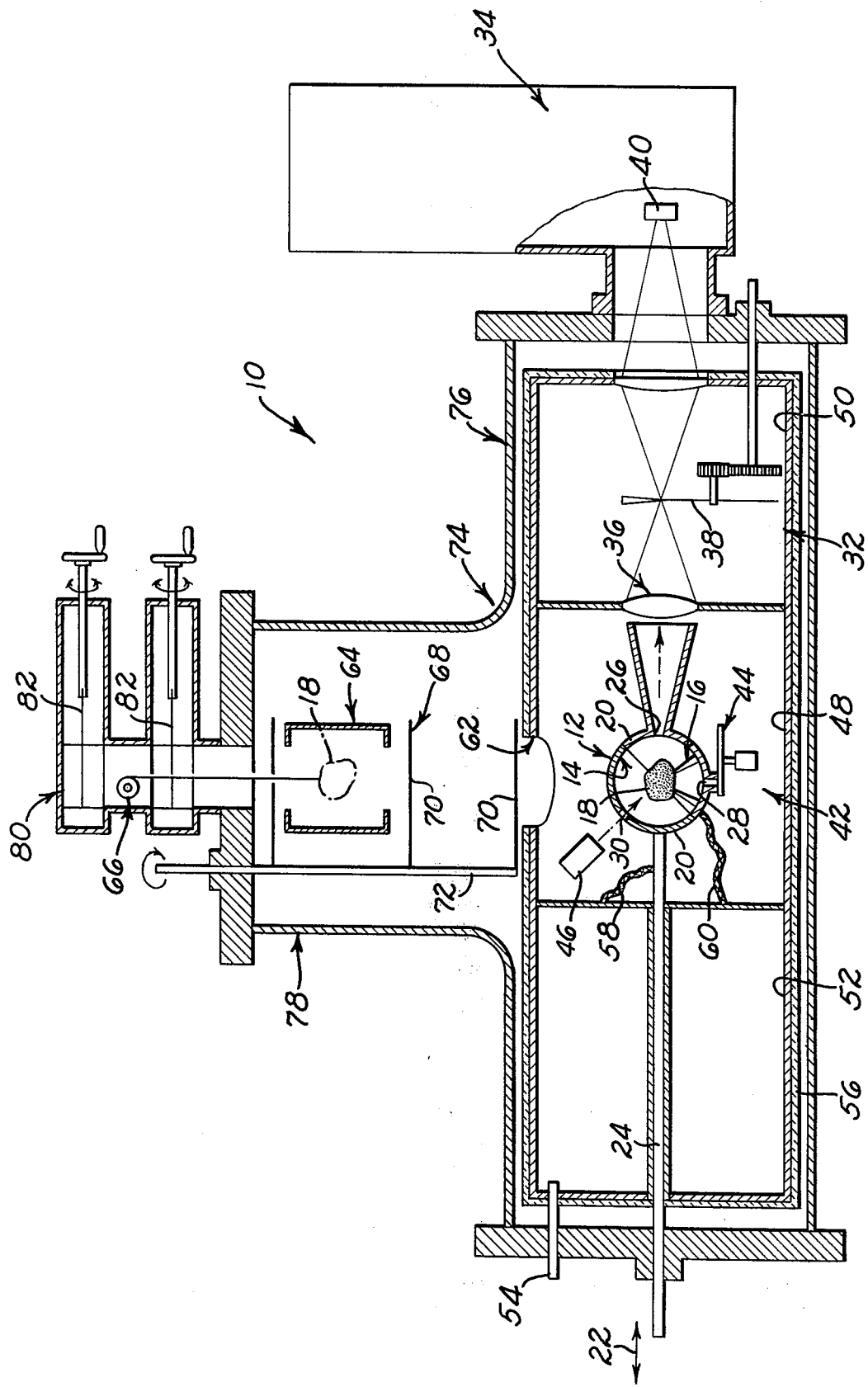

APPARATUS WITH MULTIPURPOSE SAMPLE CAVITY FOR EMISSIVITY AND ABSORPTIVITY MEASUREMENTS

BACKGROUND OF INVENTION

The present invention relates in general to an apparatus having a sample holder or chamber provided therein with a cavity adapted to receive a sample whose radiant characteristics, such as emissivity and/or absorptivity, are to be measured through a hole in the chamber. Usually, the sample cavity is spherical, although other shapes may be used.

The signal emanating from the cavity is modulated, i.e., chopped, to convert same to a.c. for convenience in detection and measurement. In such previous modulation schemes, the modulating device is in view of the detector. Thus, the modulating device itself causes a signal at the detector, this signal having the same frequency as that of the signal being measured. This spurious signal from the modulation device is one of the greatest sources of error in conventional emissivity spectrometers.

Measurements need to be made at various sample temperatures and, with conventional sample cavities, e.g., integrating spheres, heating or cooling of the sample creates thermal problems which the present invention overcomes, as will be discussed hereinafter.

Relevant prior art known to me comprises the publication "An Improved Double-Beam Infrared Microspectometer", by E. M. Bradbury and M. A. Ford, and the following U.S. Pat. Nos.:

2,342,771 Voight
2,707,900 Maresh et al.
2,730,004 Badger et al.
3,442,591 Ogura
3,506,359 Burke, Jr., et al.
3,619,073 Mendez et al.

The Bradbury et al. article is cited in the Ogura patent.

OBJECTS AND SUMMARY OF INVENTION

With the foregoing brief background in mind, primary objects of the invention are to provide a sample cavity which can be utilized with low energy level systems without affecting the energy levels thereof appreciably, and wherein measurements can be made at various sample temperatures with minimal thermal problems.

More particularly, a basic purpose of the device is to measure smaller values of emissivity and absorptivity (which are not independent) than previously possible, and to make these measurements over a large range of wavelength and temperature. A way of measuring absorption coefficients $\beta < 10^{-4} cm^{-1}$ is provided. Such low values cannot be measured in conventional transmission spectrometers, and are difficult in conventional laser calorimeters. Furthermore, conventional laser calorimeters cannot measure $\beta$ over the wavelength region needed since they operate at a discrete frequency or at a series of frequencies existing only over a limited range.

Still more particularly, an important object of the invention is to modulate a signal exiting from the cavity in such a way that the modulating means does not itself create a spurious signal.

Consistent with the foregoing, a basic object of the invention is to provide a sample chamber having therein a highly reflective sample cavity, a small signal hole through which a large portion of the energy can exit, and having a modulating hole spaced from the signal hole and periodically opened and closed to constant external temperature by a suitable modulating means or chopper.

The advantages of the modulation hole are as follows: in previous modulation schemes the modulating device was in view of the detector. Thus, the modulating device itself caused a signal at the detector, this signal having the same frequency as that of the signal being measured. This spurious signal from the modulation device, which is one of the greatest sources of error in conventional emissivity spectrometers, is eliminated by the modulation-hole technique.

Considering the foregoing in more detail, I have determined that there is an optimum signal hole size such that about one-half the energy from the sample exits. The smaller the hole, the smaller the detecting means for measuring the signal can be, and this provides a high signal-to-noise ratio. More specifically, conventional emissivity spectrometers collect only a small fraction of the radiated energy and must collect this energy from the large area of the sample. In my device, a large fraction of the radiated energy, typically one-half, is collected, and this large fraction comes from the very small area of the signal hole. This affords two advantages: a greater signal strength (approximately one-half of the radiation); and a reduced noise (since a small detector can be used as a result of the small effective area of the sample hole and smaller detectors have lower noise).

Another basic object of the invention is to provide a sample cavity which may be utilized for absorptivity measurements by directing radiant energy, such as a laser beam, into the cavity, for absorption by the sample, through an input hole spaced from the signal hole, the absorptivity of the sample being determined by spectroscopically detecting its temperature rise either through the signal hole, or the input hole. The radiation directed into the cavity makes many reflections on the walls of the cavity and is eventually absorbed by the sample.

Another, and very important, object of the invention is to minimize thermal problems by establishing the desired sample temperature externally of the sample cavity, utilizing an external temperature setting means, hereinafter referred to as a heating means for convenience. The sample, at the desired temperature, is then inserted into the sample cavity, which is split so that it can be opened to admit the sample, and subsequently closed. The sample cavity is isolated from the heating means by a shielding means which can be moved aside to permit insertion and removal of the sample.

However, the sample could be heated continuously while emissivity measurements are being made. This heating could be accomplished, for example, by directing a laser beam into the cavity through one of the existing holes, or through a separate hole. The frequency of this laser would lie in the region in which the absorptivity of the sample is sufficiently great that essentially all of the radiation would be absorbed. This is the inverse of the process of measuring the temperature in the frequency range where the emissivity is great. The use of this heating laser does not affect the operation of the system. In particular, the method of temperature measurement is not affected.

A further object of the invention is to provide an instrument which is disposed within an evacuated housing, and to provide air lock means for the introduction and removal of a sample with minimal vacuum loss.

Still another object is to provide an apparatus wherein the sample chamber is disposed within a thermally insulated compartment which is maintained at a desired, and preferably low, temperature, as by a reservoir of liquid nitrogen. A related object is to thermally connect the two halves of the sample chamber to the reservoir of liquid nitrogen, or the like.

Considering yet another object of the invention, a major source of error in conventional absorptivity measurements is absorption of radiation by a thermocouple attached to the sample. By measuring the temperature spectroscopically, this source is eliminated. It is important that in my device the sample absorbs much more of the incident radiation than in conventional absorption calorimeters. This allows smaller values of absorptivity to be measured and allows measurements to be made with smaller-power lasers.

Another important feature is the small sample-cooling rate the invention achieves. The cooling rate is small because the radiation loss is greatly reduced by the cavity and cooling by the surrounding air is reduced by operating in a vacuum.

Still another important feature resides in measuring the sample temperature by observing the black body spectrum in the region of high emissivity.

The invention may be summarized as including, and another important object thereof is to provide, an instrument for measuring sample emissivity and/or absorptivity which includes: a sample chamber having therein a sample cavity and spaced signal, modulation and input holes which communicate with the cavity; modulating means for periodically opening and closing the modulation hole to modulate a signal exiting through the signal hole; detecting means for measuring the modulated signal; means for heating a sample externally of or within the chamber; means for opening the chamber; means for inserting the sample at a desired temperature into the cavity upon opening of the chamber; movable shielding means between the chamber and the heating means; an evacuated housing containing the chamber, heating means and shielding means; air lock means through which a sample may be inserted into and removed from the housing with minimal vacuum loss; a liquid container thermally connected to both halves of the openable chamber; means for directing energy into the cavity through the input hole; and detecting means for detecting any increase in the temperature of the sample through either the signal hole or the modulation hole.

Various advantages of the instrument of the invention may be summarized as follows: the effective area of the sample, as seen by the detector, is dramatically reduced, and unpolished and/or fragmented samples may be used; a large fraction of the energy emitted by the sample is collected by the detecting means; modulation by the modulation hole provides a more effective beam balance than is achievable in a conventional chopper instrument, noise at the signal frequency introduced by conventional choppers is eliminated, and a high signal-to-noise ratio can be achieved without affecting a low energy system with which the instrument may be used; much smaller values of emissivity can be measured; the sample cooling rate is reduced by a factor ranging from 100 to 1000, which allows the sample to be heated outside the cavity and detecting system, and allows a complete spectrum to be run with the sample in the sample cavity before the sample temperature changes appreciably, thereby alleviating the problem of radiation from sample heaters scattering into the detecting system; over a certain spectral range, typically 15 to 40 $\mu$m, the emissivity of the sample is sufficiently high that radiation from the signal and modulation holes is equal to the black body radiation at the sample temperature in this spectral range, whereby this black body radiation can be used to calibrate the instrument and to measure the sample temperature, the latter being measurable from either the modulation hole or the signal hole, and temperature calibration being made before emissivity measurements are made; and a much simpler spectrometer can be used since the sample cavity gives such a large increase in the signal-to-noise ratio.

The foregoing objects, advantages, features and results of the present invention, together with various other objects, advantages, features and results which will be evident to those skilled in the emissivity and absorptivity measurement art in the light of this disclosure, may be achieved with the exemplary embodiment of the invention illustrated in the accompanying drawing and described in detail hereinafter.

Description of Drawing

The single FIGURE of the drawing illustrates schematically an instrument for measuring sample emissivity and/or absorptivity in accordance with the invention.

DESCRIPTION OF EXEMPLARY EMBODIMENT OF INVENTION

In the drawing, the emissivity and/or absorptivity measuring apparatus or instrument of the invention is designated generally by the numeral 10 and includes as its basic component a sample chamber 12 provided with a highly reflective sample cavity 14 which is shown as, and is preferably, spherical, although it may have other configurations. The sample chamber 12 is provided therein with suitable means 16 for supporting a sample 18. As previously discussed, the sample 18 may have a small surface area, may have an unpolished surface, and may even be fragmented. (In the latter event, a suitably modified supporting means, not shown, may be substituted for the diagrammatically shown supporting means 16.)

The sample chamber 12 is openable to admit the sample 18. For example, the sample chamber 12 may be split into two halves 20 one of which is suitably fixed in position and the other of which is movable toward and away from the first, as indicated by the double headed arrow 22. For this purpose, the movable chamber half 20 may have a reciprocable rod 24 connected thereto.

The sample chamber 12 is provided therein with spaced signal, modulation and input holes 26, 28 and 30 so located as to be shielded from each other.

Energy from the sample 18 exits from the cavity 14 through the signal hole 26 and passes through a spectrometer 32 of any suitable construction to a detector system 34. The spectrometer 32 may, for example, include a suitable optical system 36 and an externally controllable filter wheel 38 for selecting the desired portion of the spectrum to be examined. The detector system 34 includes a suitable detector or detecting means 40 which typically is a temperature (wavelength) detector.

As previously indicated, the signal hole 26 is small compared to the signal holes of prior integrating spheres. More particularly, as hereinbefore discussed in detail, I have found that there is an optimum hole size permitting approximately one-half the energy to exit. The smaller the hole, the smaller the detector system 34 can be, and this provides an improved signal-to-noise ratio, which is an important feature. More particularly, conventional emissivity spectrometers collect only a small fraction of the radiated energy and must collect this energy from the large area of the sample. In my device, a large fraction of the radiated energy, typically one-half, is collected, and this large fraction comes from the very small area of the signal hole 26. This affords two advantages: a greater signal strength (approximately one-half of the radiation); and a reduced noise (since a small detector can be used as a result of the small effective area of the sample hole and smaller detectors have lower noise).

The modulation hole 28 is periodically opened and closed to spoil the Q of the cavity 14 by periodically opening and closing same to constant temperature at 42, which will be discussed in more detail hereinafter. Such periodic opening and closing of the modulation hole 28 is performed by a modulating means 44 which may comprise simply a rotary chopper the rotor of which is positioned in close proximity to the outer end of the modulation hole. With this construction, the signal emanating from the signal hole 26 is modulated without the usual introduction of a spurious signal produced by direct chopping of the emitted energy itself, which is an important feature. In previous modulation schemes the modulating device is in view of the detector. Thus, the modulating device itself causes a signal at the detector, this signal having the same frequency as that of the signal being measured. This spurious signal from the modulation device, which is one of the greatest sources of error in conventional emissivity spectrometers, is eliminated by the modulation-hole technique.

When the instrument 10 is to be used as an absorptivity measuring device, a source 46 of radiant energy, such as a laser source, directs energy into the cavity 14 through the input hole 30. Any resultant increase in the temperature of the sample 18 is detected, preferably spectroscopically, through the signal hole 26 by the detecting means 40, or can be detected through the modulation hole 28 through a suitably located detecting means, not shown, externally of the sample chamber 12.

The sample chamber 12 is disposed in a compartment 48 having a compartment 50 for the spectrometer 32 on one side thereof and having on the other side thereof a compartment or reservoir 52 for liquid nitrogen, or other material providing a desired temperature reference. A fill tube 54 leads into the reservoir 52.

The three compartments 48, 50 and 52 may be formed of a single cylinder, preferably of copper, closed at its ends, the compartments being separated by suitable partitions as shown. The closed-end cylinder is provided with suitable thermal insulation 56. The two halves of the sample chamber 12 are maintained at as nearly the same temperature as the reservoir 52 as possible by thermally connecting them to the partition separating the reservoir 52 from the compartment 48, as by means of lengths of copper braid 58 and 60. The former is shown as connected to the actuating rod 24 for the movable chamber half, and the latter is shown as connected to the fixed chamber half.

With the foregoing construction, the sample chamber compartment 48 provides a constant temperature at 42, which may be any desired temperature, such as 4K, 77K, 300K, or other value.

The sample chamber compartment 48 is provided on the opposite side thereof with an aperture 62 for the introduction and removal of the sample 18. Externally of the compartment 48, and in alignment with the sample chamber 12 and the aperture 62, is a heating means 64 for establishing a desired sample temperature prior to insertion of the sample into the sample cavity 14. The sample 18 may be lowered into the heating means 64, and then into the sample chamber 12, and may be removed from the sample chamber, by a diagrammatically shown hoisting means 66.

When emissivity and/or absorptivity measurements are being made with the sample 18 in the cavity 14, a shielding means 68 is interposed between the heating means 64 and the aperture 62 to thermally isolate the compartment 48 from the heating means. (It will be noted that the particular construction shown thermally isolates the spectrometer compartment 50 and the reservoir 52 as well.) The shielding means 68 is shown diagrammatically as comprising shields 70 spaced apart in the direction of sample travel and rotatable out of the sample path by means of a supporting rod 72 controllable from the exterior of the instrument 10.

The cylindrical system of compartments 48, 50 and 52 and the heating and shielding means 64 and 68 are enclosed by an outer housing 74 which is generally T-shaped, having a cylindrical portion 76 which receives the assembly of compartments 48, 50 and 52, and having a laterally projecting cylindrical neck 78 which receives the heating and shielding means 64 and 68. This particular outer housing configuration further serves to thermally isolate the system of compartments 48, 50 and 52 from the heating means 64.

The interior of the outer housing 74 is maintained evacuated in any suitable manner, not shown, and, to minimize vacuum losses, the neck portion 78 of the outer housing is provided with an air lock means 80 through which the sample 18 may be inserted and removed. The air lock means 80 is shown simply as comprising two gates 82 which may be opened and closed sequentially in admitting or removing the sample 18, in a manner which will be apparent.

The idea of being able to remove the sample, heat it, and replace it in the cavity is important, as has been stressed. However, the sample could be heated continuously while emissivity measurements are being made. This heating could be accomplished, for example, by directing a laser beam into the cavity 14 through one of the existing holes 26, 28, or 30, or through a separate hole. The frequency of this laser would lie in the region in which the absorptivity of the sample is sufficiently great that essentially all of the radiation would be absorbed. This is the inverse of the process of measuring the temperature in the frequency range where the emissivity is great. The use of this heating laser does not affect the operation of the system. In particular, the method of temperature measurement is not affected.

Considering the over-all operation of the instrument 10, it will be apparent that the sample 18 is introduced through the air lock means 80 into the heating means 64, and is then brought to the desired temperature with the shielding means 68 in blocking position. Subsequently, the shielding means 68 is retracted, the sample chamber 12 is opened, the sample 18 is inserted into the sample cavity 14, and the chamber 12 is closed. Thereafter, the desired emissivity and/or absorptivity measurements are made with the detecting system 34, the source 46 being energized if absorptivity measurements are to be made. Thus, the sample temperature is set outside the sample cavity 14, and the desired measurements can be made with minimal external thermal interference. The sample-cooling rate is small because the radiation loss is greatly reduced by the cavity and cooling by the surrounding air is reduced by operating in a vacuum. It will be noted that the modulation hole 28, being on the opposite side of the sample chamber 12 from the aperture 62, is further protected from thermal interference by the sample chamber itself. In addition to being thermally shielded in this manner, the modulation hole 28 is completely shielded from the spectrometer system 32. It will be further noted that the sample cavity 14 is maintained at essentially the same temperature as the temperature at 42. By isolating the various components of the instrument from each other thermally in the foregoing manner, the instrument 10 is virtually unaffected by radiation from the heating means 64, there being virtually no reflection and scattering of radiant heat into the optical system in the spectrometer 32, for example. Additionally, the sample chamber 12 itself serves as a thermal insulator preventing heat from the sample 18 from scattering into the system to any appreciable extent.

The invention measures smaller values of emissivity and absorptivity (which are not independent) than previously possible and makes these measurements over a large range of wavelength and temperature. A method of measuring absorption coefficients $\beta < 10^{-4} cm^{-1}$ is provided. Such low values cannot be measured in conventional transmission spectrometers, and are difficult in conventional laser calorimeters. Furthermore, conventional laser calorimeters cannot measure $\beta$ over the wavelength region needed since they operate at a discrete frequency or at a series of frequencies existing only over a limited range.

As previously mentioned, throughout a spectral range which typically includes 15 to 40 $\mu m$, the emissivity of the sample 18 is sufficiently high that radiation from the signal and modulation holes 26 and 28 is equal to the black body radiation at the sample temperature in this spectral range. The black body radiation in the region of high emissivity can be used to calibrate the instrument and to measure the sample temperature, which temperature measurement can be made spectroscopically from the modualation hole or the signal hole in the 15 to 40 $\mu m$ region. The temperature calibration could be made with a thermocouple, or equivalent, on the sample before emissivity measurements are made.

(However, the temperature measurement is preferably made spectrosopically, since a major source of error in conventional absorptivity measurements is absorption of radiation by a thermocouple attached to the sample. By measuring the temperature spectroscopically, this source is eliminated. It is important that in my device the sample absorbs much more of the incident radiation than in conventional absorption calorimeters. This allows smaller values of absorptivity to be measured and allows measurements to be made with smaller-power lasers.) Problems of insuring that references and samples are at the same temperature do not arise since the black body radiation from 15 to 40 $\mu m$ is at the sample temperature. When operating at a lower wavelength such as 10 $\mu m$, the desired emissivity measurement may be made throughout the entire spectrum without any appreciable temperature drop.

Although exemplary embodiments of the invention have been disclosed for illustrative purposes, it will be understood that various changes, modifications and substitutions may be incorporated in such embodiments without departing from the invention as hereinafter claimed.

I claim as my invention:

1. In an apparatus for measuring radiant characteristics of a sample, the combination of:
  a. a sample chamber having therein a sample cavity and spaced holes which communicate with said cavity and one of which is a modulation hole; and
  b. means for modulating the optical characteristics of said cavity, comprising means for periodically opening and closing said modulation hole to a constant reference temperature.

2. In an apparatus for measuring radiant characteristics of a sample, the combination of:
  a. a sample chamber having therein a sample cavity and a modulation hole which communicates with said cavity; and
  b. means for modulating the optical characteristics of said cavity, comprising means for periodically opening and closing said modulation hole to a constant reference temperature.

3. An apparatus according to claim 2 wherein said cavity is substantially spherical.

4. An apparatus as defined in claim 2 including means for heating the sample externally of said cavity.

5. An apparatus as defined in claim 2 including means for heating the sample by directing radiant energy into said cavity.

6. In an apparatus for measuring radiant characteristics of a sample, the combination of:
  a. a sample chamber having therein a sample cavity and spaced signal and modulation holes which communicate with said cavity;
  means for modulating the optical characteristics of said cavity, comprising means for periodically opening and closing said modulation hole to a constant reference temperature to modulate a signal emanating from said cavity through said signal hole; and
  c. signal detecting means for detecting the modulated signal.

7. An apparatus as defined in claim 6 wherein said chamber is openable, said apparatus further including:
  a. means for heating a sample externally of said chamber;
  b. means for opening said chamber; and
  c. means for inserting the heated sample into said cavity upon opening of said chamber.

8. An apparatus as set forth in claim 7 including movable means for shielding said chamber from said heating means.

9. An apparatus according to claim 8 including:
  a. an evacuated housing containing said chamber, said heating means and said shielding means; and b. air lock means on said housing through which a sample may be inserted into and removed from said housing with a minimum vacuum loss.

10. An apparatus as defined by claim 9 including a liquid gas container thermally connected to said chamber.

11. An apparatus as set forth in claim 6 wherein one of said holes is an input hole, said apparatus further including:

a. means for directing radiant energy into said cavity through said input hole; and b. temperature detecting means for detecting the temperature of the sample through one of said holes.

12. A method of modulating a radiant signal emanating from a sample in a sample cavity, comprising periodically opening said cavity to a constant reference temperature.

13. A method of modulating a radiant signal emanating from a sample in a sample cavity, comprising periodically opening said cavity, at a point spaced from the point of exit of said signal, to a constant reference temperature.

14. In an apparatus for measuring radiant characteristics of a sample, the combination of:

a. a sample chamber having therein a sample cavity and a signal hole which communicates with said cavity; and b. modulating means for modulating the optical properties of said cavity comprising means for periodically opening said cavity to a constant reference temperature at a point spaced from said signal hole.

* * * * *